US010069368B2

(12) United States Patent
Chen et al.

(10) Patent No.: US 10,069,368 B2
(45) Date of Patent: Sep. 4, 2018

(54) END CAP FOR OUTER ROTOR MOTOR (71) Applicant: Nidec Motor Corporation, St. Louis, MO (US)

(72) Inventors: Luke Chen, Jiaozhou (CN); Dengchang Shi, Qingdao (CN)

(73) Assignee: Nidec Motor Corporation, St. Louis, MO (US)

(*) Notice: Subject to any disclaimer, the term of this patent is extended or adjusted under 35 U.S.C. 154(b) by 234 days.

(21) Appl. No.: 15/065,663

(22) Filed: Mar. 9, 2016

(65) Prior Publication Data

US 2017/0126090 A1   May 4, 2017

(30) Foreign Application Priority Data

Oct. 30, 2015   (CN) .......................... 2015 1 0727898

(51) Int. Cl.
*H02K 5/15* (2006.01)
*H02K 3/52* (2006.01)

(52) U.S. Cl.
CPC ......... *H02K 3/522* (2013.01); *H02K 2203/06* (2013.01); *H02K 2203/12* (2013.01)

(58) Field of Classification Search
CPC .. H02K 3/04; H02K 3/32; H02K 3/34; H02K 3/345; H02K 3/48; H02K 3/487; H02K 3/38; H02K 3/52; H02K 3/522; H02K 7/14; H02K 7/18; H02K 7/181; H02K 7/1815; H02K 9/06
See application file for complete search history.

(56) References Cited

U.S. PATENT DOCUMENTS

| | | | |
|---|---|---|---|
| 6,856,055 B2 | 2/2005 | Michaels et al. | |
| 7,138,741 B2 * | 11/2006 | Lee | H02K 3/522 310/194 |
| 7,342,334 B2 | 3/2008 | Hilton et al. | |
| 7,615,907 B2 * | 11/2009 | Fei | H02K 1/148 310/216.114 |
| 7,692,350 B2 | 4/2010 | Hoemann et al. | |
| 7,777,386 B2 * | 8/2010 | Horst | H02K 1/146 310/156.01 |
| 8,344,568 B2 | 1/2013 | Bailey et al. | |
| 8,405,268 B2 | 3/2013 | Bailey et al. | |
| 8,482,176 B2 | 7/2013 | Bailey et al. | |
| 8,567,043 B2 | 10/2013 | Horst et al. | |
| 8,692,424 B2 | 4/2014 | Bohrer et al. | |
| 8,716,912 B2 | 5/2014 | Bailey et al. | |
| 9,000,639 B2 | 4/2015 | Bailey et al. | |

(Continued)

FOREIGN PATENT DOCUMENTS

JP    2012075215 A  *  4/2012

*Primary Examiner* — Tran Nguyen
(74) *Attorney, Agent, or Firm* — Hovey Williams LLP (57) ABSTRACT An outer rotor motor includes a stator, an end cap for use with the stator, and a stator mount operable to facilitate mounting of the stator to a machine. The end cap includes wire-routing structure facilitating routing of the stator wiring. The structure includes a wire-routing trough that defines a wiring pathway though which the wiring is routed. The trough is positioned at least in part radially inside the core and includes a bottom located between the core margins. The trough further includes a side that is spaced radially inward from the core and projects at least in part axially relative to the bottom. The stator mount is radially located within the wiring pathway.

25 Claims, 10 Drawing Sheets

(56) References Cited

U.S. PATENT DOCUMENTS

| | | | |
|---|---|---|---|
| 9,391,487 B2 | 7/2016 | Bailey et al. | |
| 2011/0193433 A1* | 8/2011 | Bohrer | H02K 3/522 |
| | | | 310/71 |
| 2013/0140926 A1* | 6/2013 | Bailey | H02K 1/187 |
| | | | 310/71 |
| 2013/0278094 A1* | 10/2013 | Peterson | H02K 1/187 |
| | | | 310/64 |
| 2014/0010642 A1 | 1/2014 | Horst et al. | |
| 2015/0076933 A1* | 3/2015 | Hoemann | H02K 3/487 |
| | | | 310/43 |
| 2015/0145361 A1* | 5/2015 | Peterson | H02K 1/187 |
| | | | 310/71 |

* cited by examiner

END CAP FOR OUTER ROTOR MOTOR

CROSS REFERENCE TO RELATED APPLICATION

This application claims priority of Chinese Application Serial No. 201510727898.7, filed Oct. 30, 2015, the entirety of which is hereby incorporated by reference herein.

BACKGROUND OF THE INVENTION

1. Field of the Invention

The present invention relates generally to an electric motor for use in a machine. More specifically, the present invention concerns an outer rotor motor including a stator spaced at least in part radially inside the rotor.

2. Discussion of the Prior Art

Those of ordinary skill in the art will appreciate that electric motors are often used in home appliances such as dishwashers, washing machines, and ceiling fans. Electric motors are additionally often used in both residential and commercial heating and air conditioning systems, as well as a variety of other applications. Although a variety of motor component arrangements may be used, one known embodiment of an electric motor includes a stator positioned at least in part radially inside a rotor. An electric motor having such a configuration is commonly referred to as an outer rotor motor or external rotor motor, although other names may be used.

The stator of an outer rotor motor typically includes a core and a plurality of coils. Conventionally, the core takes a generally toroidal form and is composed of a ferromagnetic metal such as iron or steel. The core typically includes a plurality of teeth projecting radially outwardly and defining slots therebetween. The coils are formed by the winding of electrically conductive wire multiple times around each tooth to at least partially fill the slots.

A variety of techniques exist for distribution of the wire about the core (e.g., from one tooth to another tooth). However, such techniques are time-consuming, expensive, and conducive toward errors. Such techniques additionally leave the wires prone to damage, loosening, and displacement, potentially leading to motor malfunctions.

SUMMARY

According to one aspect of the present invention, an outer rotor motor is provided for use in a machine. The motor comprises a rotor rotatable about an axis, a stator spaced at least in part radially inside the rotor, and an end cap including wire-routing structure facilitating routing of the wiring. The stator includes a generally toroidal core that presents axially spaced apart core margins. The stator further includes wiring wound around the core. The structure includes a wire-routing trough that defines a wiring pathway though which the wiring is routed. The trough is positioned at least in part radially inside the core. The trough includes a bottom located between the core margins. The trough includes a side that is spaced radially inward from the core and projects at least in part axially relative to the bottom.

Numerous advantages are provided as a result of the wire-routing structure including a wire-routing trough that defines a wiring pathway though which the wiring is routed, wherein the trough is positioned at least in part radially inside the core, includes a bottom located between the core margins, and includes a side that is spaced radially inward from the core and projects at least in part axially relative to the bottom. For example, the inventive construction enables wiring to be distributed about the core efficiently, inexpensively, and with high accuracy. Furthermore, such an arrangement provides protection to the wiring against environmental or structural damage, loosening, and displacement; thus, in turn leading to improved motor reliability.

According to another aspect of the present invention, an outer rotor motor is provided for use in a machine. The motor comprises a rotor rotatable about an axis, a stator spaced at least in part radially inside the rotor, an end cap positioned at least in part radially inside the core, and a stator mount operable to facilitate mounting of the stator to the machine. The stator includes wiring. The end cap includes wire-routing structure facilitating routing of the wiring. The structure includes a wire-routing trough that defines a wiring pathway though which the wiring is routed. The stator mount is radially located within the wiring pathway.

The provision of a stator mount radially located within the wiring passageway defined the by wire-routing trough of the wire-routing structure affords a number of advantages. For example, this feature enables efficient utilization of space and minimizes the presence of radially inward obstructions. That is, the stator defines an unobstructed, generally annular opening that provides space for other motor and/or machine components, as necessary. The total size of the motor envelope may therefore be reduced.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein.

The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, it should be understood that directional references (e.g., top, bottom, upper, lower, front, back, etc.) as used herein should be understood only in a contextual sense relative to one another. For instance, a component referred to as being an upper component might, in some implementations of the present invention, instead actually be a lower component.

Figure 1:
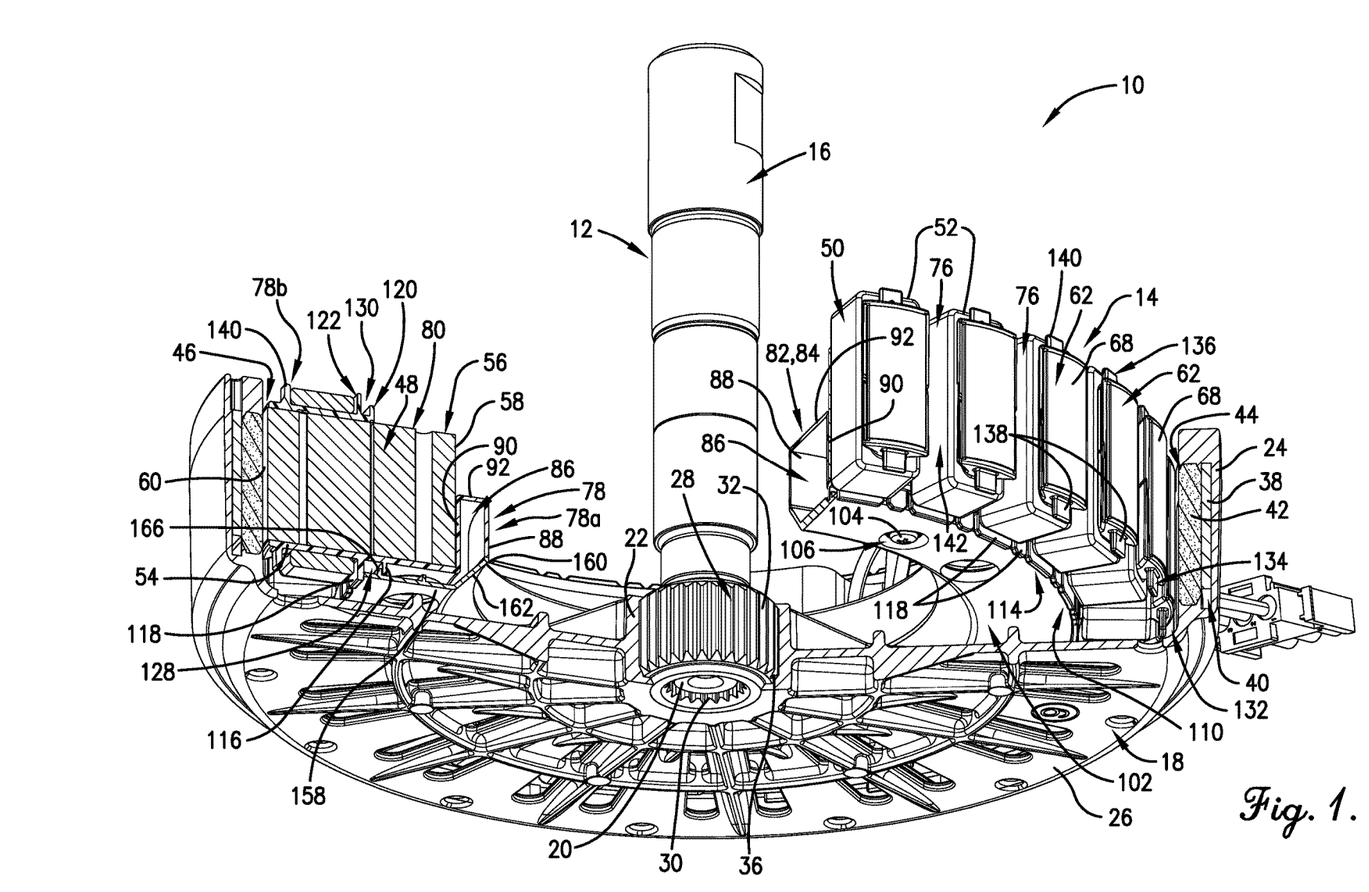
FIG. 1 is a bottom perspective view of a motor according to a preferred embodiment of the present invention.
Figure 2:
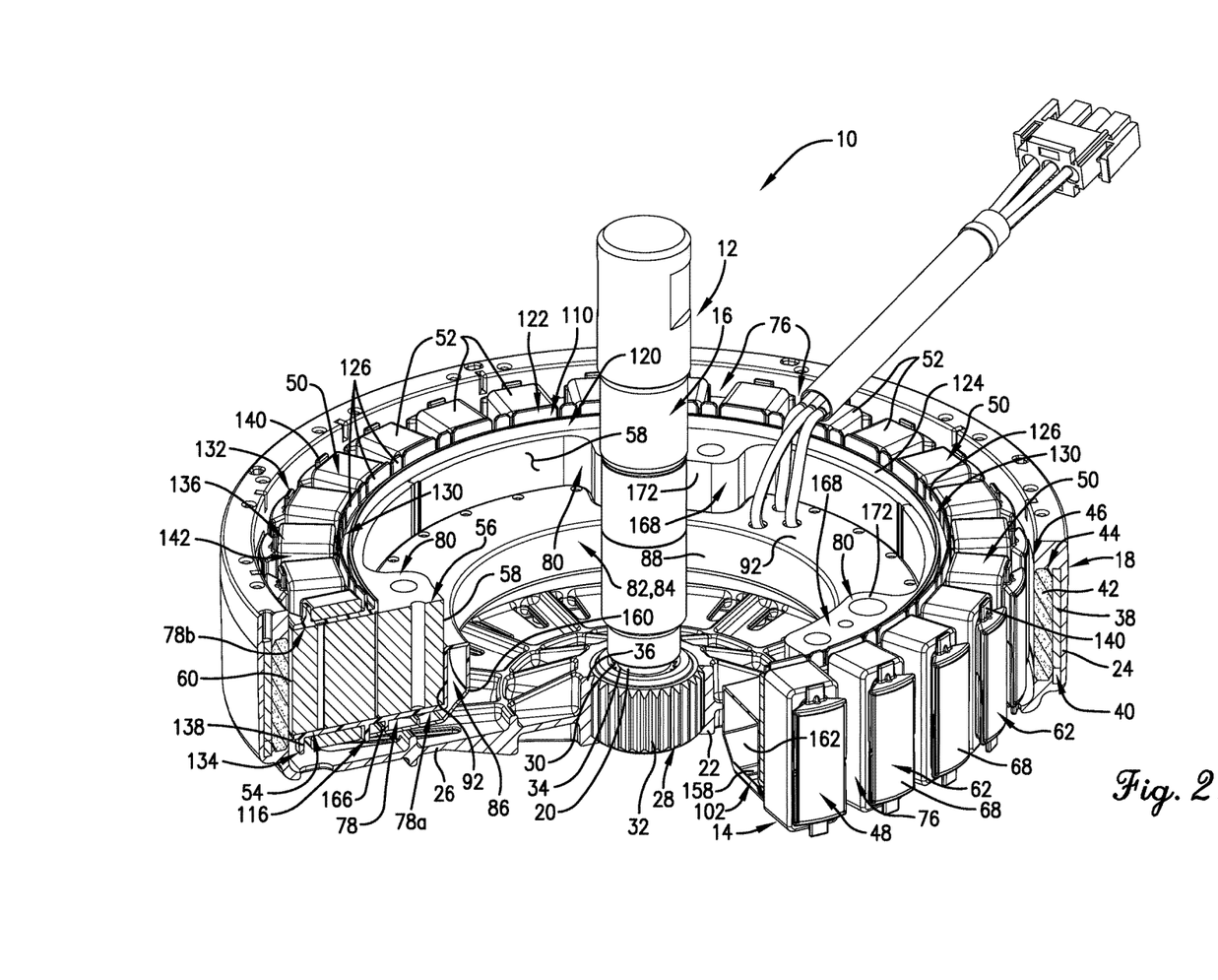
FIG. 2 is a top perspective view of the motor of FIG. 1.
Figure 3:
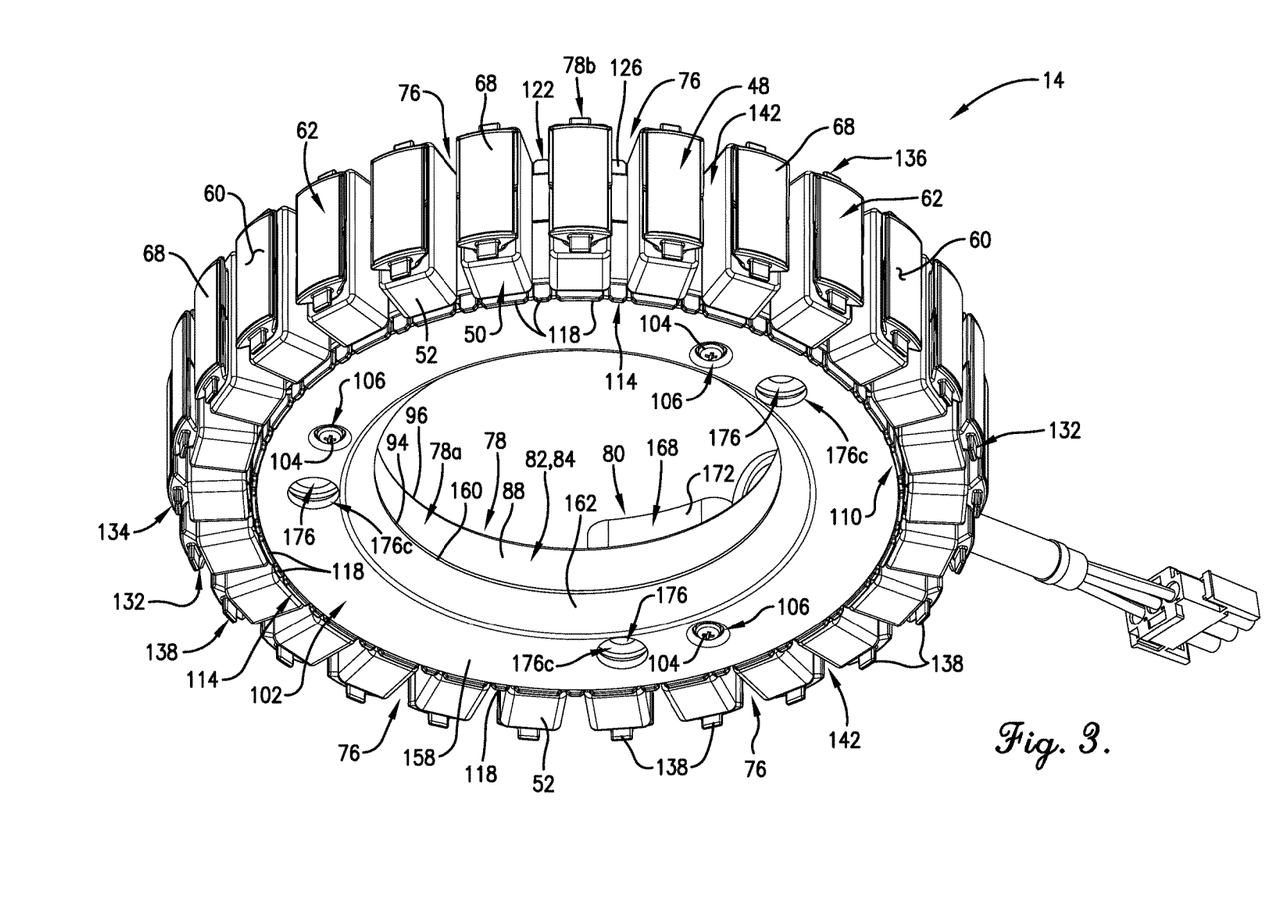
FIG. 3 is a bottom perspective view of the stator and end cap of the motor of FIGS. 1 and 2.

With initial reference to FIGS. 1 and 2, an electric motor 10 constructed in accordance with a preferred embodiment of the present invention is depicted for use in a machine, device, or appliance (e.g., a home appliance such as a dishwasher, washing machine, or ceiling fan; a residential or commercial heating and air conditioning system; an exercise device; etc.).

As is customary, the motor 10 broadly includes a rotor 12 and a stator 14. The motor 10 is preferably an outer rotor motor 10 in which the stator 14 is spaced at least partially inside the rotor 12.

The rotor 12 includes a rotatable shaft 16 connected to a rotor can 18 at a machine connection end 20. More particularly, in the preferred embodiment illustrated in FIGS. 1 and 2, the rotor can 18 includes a generally axially extending, radially inner hub 22; a generally axially extending, radially outer sidewall 24; and a base 26 extending generally radially between and interconnecting the hub 22 and the sidewall 24. The shaft 16 is preferably interconnected to the hub 22 by means of a coupler 28.

In a preferred embodiment, as illustrated, the coupler 28 is a metal coupler including a plurality of inner splines 30 and a plurality of outer splines 32. The motor connection end 20 of the shaft 16 includes a plurality of outer splines 34 (see FIG. 1) that engage the inner splines 30 of the coupler 28. Similarly, the hub 22 preferably includes a plurality of inner splines 36 that engage the outer splines 32 of the coupler 28. The shaft 16, the coupler 28, and the rotor can 18 are thereby preferably interconnected in such a manner as to restrict relative rotation therebetween, with the shaft 16, and the coupler 28, and the rotor can 18 thereby rotating in unison. It is noted that a variety of other suitable means may be incorporated to rotationally fix the components to one another.

The rotor can 18 is preferably a plastic component overmolded to the coupler 28; however, the principles of the present invention are equally applicable to other rotor can designs and manufacturing techniques.

The rotor 12 also preferably includes a circumferentially extending backing ring 38 supported by the rotor can 18. More particularly, the sidewall 24 preferably defines a circumferentially extending channel 40 that houses the backing ring 38.

Preferably, the backing ring 38 comprises a sheet or ribbon of metal wrapped continuously circumferentially to define a plurality of layers. (For the sake of clarity, individual layers of the backing ring 38 are not shown.) Preferably, the metal comprises iron. However, a ring comprising only a single layer and/or comprising one of more of a variety of materials falls within the scope of the present invention.

The rotor 12 further preferably includes a plurality of magnets 42. The magnets 42 are preferably permanent magnets comprising neodymium or another suitable material. The sidewall 24 of the rotor can 18 preferably defines a plurality of circumferentially spaced magnet slots 44 positioned radially inwardly of the channel 40 housing the backing ring 38. The magnet slots 44 preferably house corresponding ones of the magnets 42.

The magnet slots 44 are preferably positioned and the magnets 42 preferably shaped such that a circumferential gap 46 between the magnets 42 and the stator 14 is defined. However, a variety of means by which the magnets 42 are appropriately positioned fall within the ambit of the present invention.

Furthermore, the channel 40 is preferably positioned and the backing ring 38 preferably shaped such that the backing ring 38 is disposed radially outward of and immediately adjacent (most preferably, in contact with) the magnets 42. Thus, the magnets 42 and the backing ring 38 both circumscribe the stator 14 in a spaced relationship.

Although the above-described general configuration of the rotor 12 is preferred, it is noted that a variety of outer rotor motor configurations fall within the scope of the present invention.

In a preferred embodiment, the stator 14 includes a generally toroidal core 48 and wiring 50 wound about the core 48 to form a plurality of coils 52. In the preferred embodiment as shown, the core 48 presents axially spaced apart upper and lower margins 54 and 56, respectively, as well as radially spaced apart radially innermost and outermost circumferential faces 58 and 60, respectively.

Figure 8:
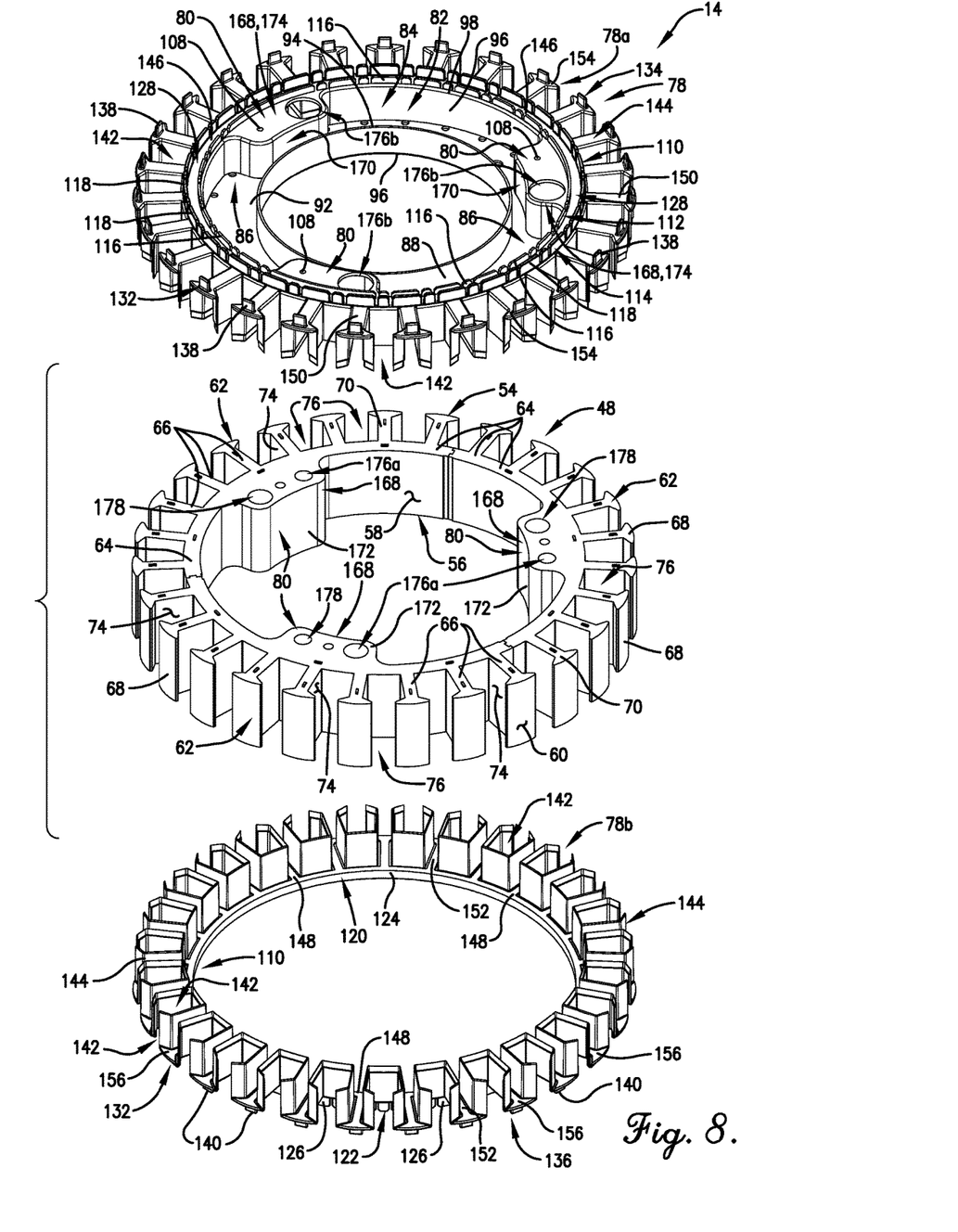
FIG. 8 is an exploded bottom perspective view of the stator core and end cap, with the cover removed.
Figure 9:
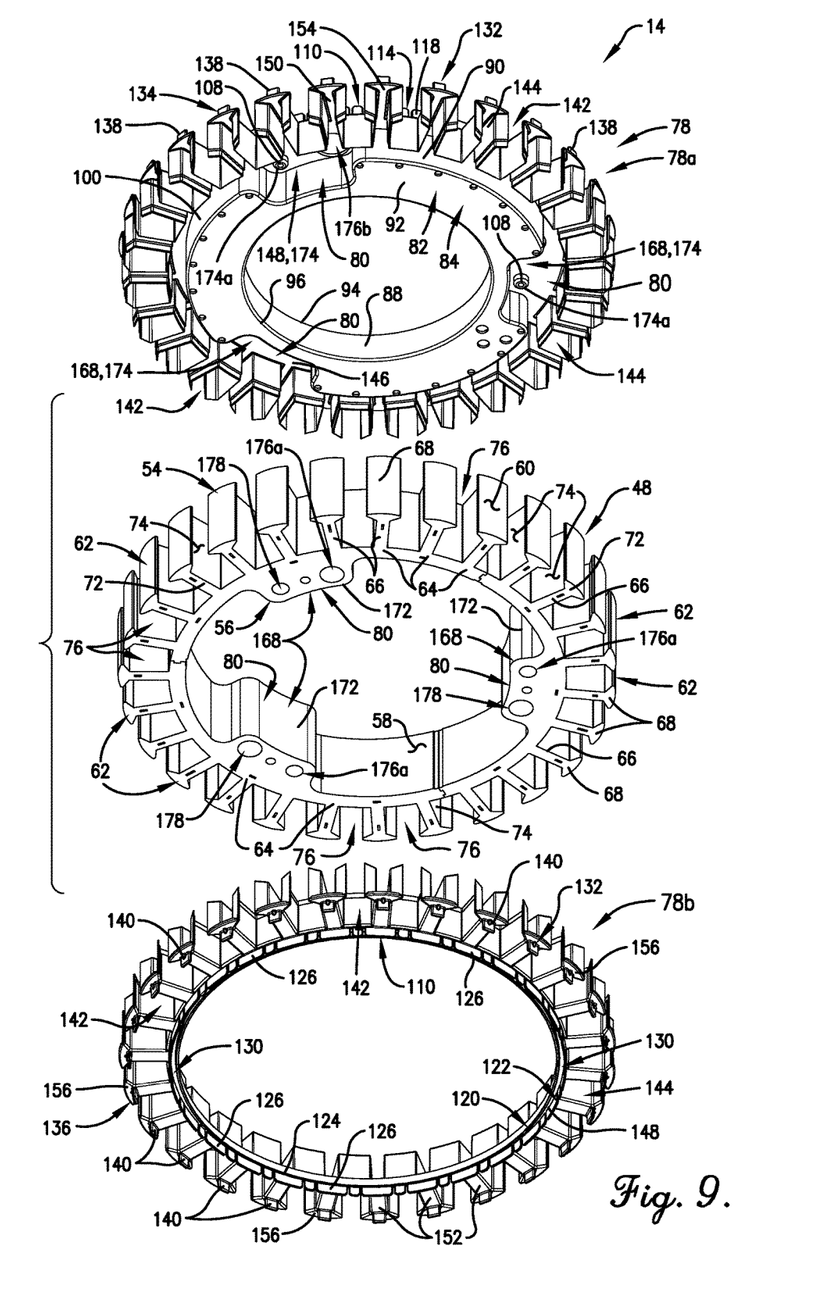
FIG. 9 is an exploded top perspective view of the stator core and end cap (with the cover removed) of FIG. 8.

As best shown in FIGS. 8 and 9, the core 48 preferably includes a plurality of radially projecting teeth 62, each of which comprises a generally arcuately extending yoke 64, an arm 66 extending generally radially from the yoke 64, and a crown 68 extending generally arcuately from the arm 66. The yokes 64 are preferably interconnected and collectively present the innermost circumferential face 58, while the arms 66 and the crowns 68 are arcuately spaced apart to define slots 76 therebetween. Each tooth 62 presents an upper face 70, a lower face 72, and two side faces 74. The crowns 68 of teeth 62 collectively present the outermost circumferential face 60, which is thus discontinuous.

The stator core 48 preferably comprises a ferromagnetic material such as steel and is preferably a laminated structure. However, it is within the ambit of the present invention for the core 48 to comprise an alternative material and be of an alternative construction. For instance, the core 48 could be integrally formed, be composed of iron, include a continuous annular base ring from which the teeth 62 project, or feature a combination of these or other variations known to one skilled in the art.

The wiring 50 preferably comprises an electrically conductive material and is wound multiple times around each individual tooth 62 to form corresponding ones of the coils 52 of the stator 14. The wiring 50 preferably substantially comprises a plurality of aluminum wires, although it is within the scope of the present invention to use other types of electrically conductive wires (such as copper). The wires may or may not be provided with coatings. (Note that the coils 52 are shown only schematically and have been removed from the teeth 62 in some figures for the sake of clarity. However, in practice, the coils 52 would be found on each tooth 62 and would comprise multiple windings of the wiring 50.) As is customary, the wiring 50 is wound around the teeth 62 in a particular pattern according to phasing of the motor 10, as will be explained further hereinbelow.

The motor 10 further preferably includes an end cap 78 and a stator mount 80. Additional details of the preferred embodiments of the end cap 78 and the stator mount 80 will be discussed in more detail below.

Figure 4:
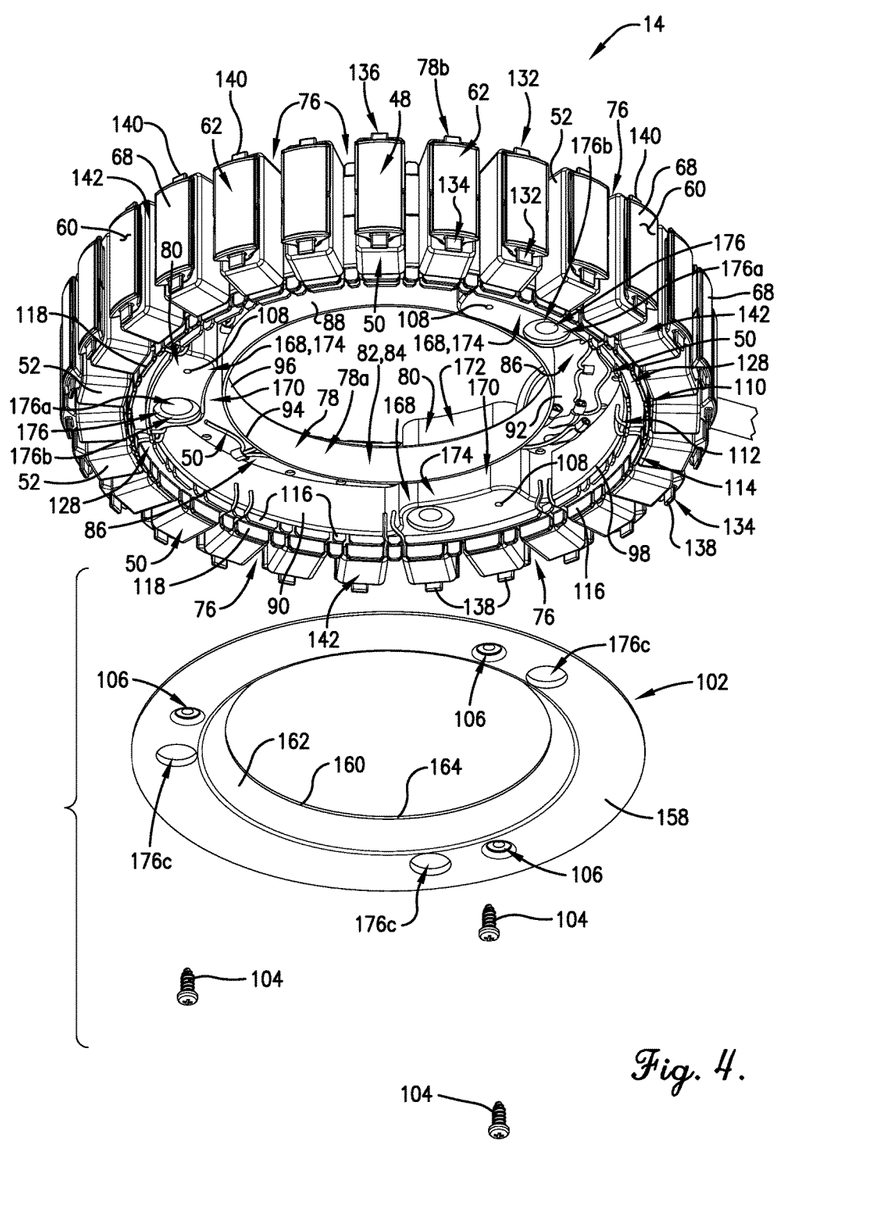
FIG. 4 is an exploded bottom perspective view of the stator and end cap of FIGS. 1-3.
Figure 5:
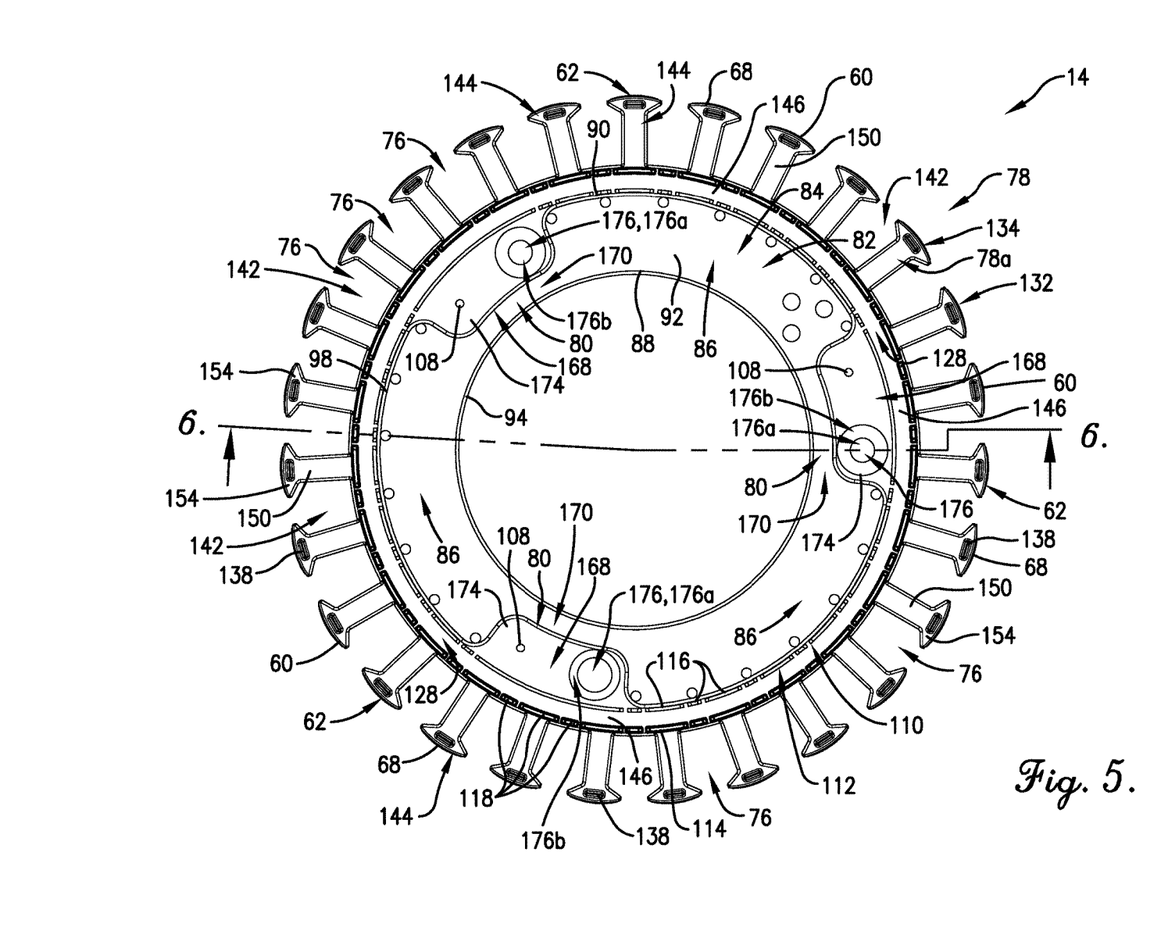
FIG. 5 is a bottom view of the stator and end cap of FIGS. 1-4, with the coils and cover removed.

In a preferred embodiment, the end cap 78 includes wire-routing structure 82 facilitating routing of the wiring 50. The wire-routing structure 82 preferably includes a wire-routing trough 84 that defines a wiring pathway 86 through which the wiring 50 is routed. Details of such routing will vary according to the specific details of the motor 10 (e.g., the desired winding pattern to be facilitated). However, FIG. 4 provides a schematic illustration showing wiring 50 (with wires truncated for clarity) extending through the wiring pathway 86.

Preferably, the trough 84 is positioned at least in part radially inside the core 48. More particularly, the trough 84 preferably includes a radially inner side 88, a radially outer side 90, and bottom 92 extending between and interconnecting the sides 88 and 90. It is particularly noted that, as briefly discussed above, the so-called bottom 92 may in a preferred embodiment be oriented so as to be an upper component (i.e., a top). For instance, as illustrated, the trough 84 is an inverted trough, in which the bottom 92 forms a ceiling of sorts to the trough 84 when viewed in the context of the illustrated motor orientation.

The bottom 92 is preferably located between the upper and lower margins 54 and 56 of the core 48, and the sides 88 and 90 are each preferably positioned radially inward from the core 48. More particularly, it is preferred that the inner side 88 is spaced radially inward from the core 48 whereas the outer side 90 abuts the radially innermost circumferential face 58 of the core 48.

The sides 88 and 90 each preferably project at least in part axially relative to the bottom 92. Most preferably, the sides 88 and 90 each project generally axially relative to the bottom 92 in their entireties and are at least substantially parallel to each other. Some or all of one of both of the sides may project in a generally non-axial (e.g. stepped) manner, or portions or the entireties of the sides may be non-parallel, without departing from some aspects of the present invention, however. For example, the sides may alternatively converge toward the bottom, such that the bottom is essentially an apex defined cooperatively by the sides.

Although it is preferred that both the inner side 88 and the outer side 90 are provided to define the trough 84, it is noted that it is permissible according to some aspects of the present invention for the trough and, in turn, the wiring pathway itself, to be defined without the presence of two sidewalls. For instance, the core itself (more particularly, the innermost circumferential face of the core) might instead cooperate with the inner side and the bottom to form a trough that is devoid of an end-cap-defined outer wall.

Preferably, the trough 84 extends generally circumferentially and is circumferentially continuous, such that the wiring 50 may be routed continuously around the core 48.

The inner side 88 preferably presents axially spaced apart top and bottom edges 94 and 96, respectively. Similarly, the outer side 90 preferably presents axially spaced apart top and bottom edges 98 and 100. The bottom 92 preferably extends between and interconnects the bottom edges 96 and 100§. It is permissible according to some aspects of the invention, however, for either or both of the sides to include structure extending below the bottom such that the bottom extends between and interconnects mid-portions, top edges, or disparate locations (e.g., one bottom edge and one mid-portion) on/of the sides.

Preferably, the bottom 92 is generally centered between the upper and lower margins 54 and 56 of the core 48. It is within the ambit of some aspects of the present invention, however, for the bottom 92 to be offset toward either of the upper and lower margins 54 and 56.

In a preferred embodiment, as illustrated, the top edges 94 and 98 of the sides 88 and 90, respectively, are axially offset from each other. More particularly, it is preferred that the top edge 94 of the inner side 88 is axially recessed relative to the top edge 98 of the outer side 90. Alternatively described, the inner side 88 is preferably axially shorter than the outer side 90.

The end cap 78 further preferably includes a cover 102. The cover 102 is preferably configured such that, when secured to the remainder of the end cap 78, the cover 102 and the wire-routing structure 82 cooperatively at least substantially enclose the wiring pathway 86. The cover 102 is preferably secured to the remainder of the end cap 78 by a plurality of fasteners 104 (most preferably screws) that extend through fastener-receiving holes 106 in the cover 102 and into corresponding fastener-receiving apertures 108 in the remainder of the end cap 78. The cover 102 and its fixation to the remainder of the end cap 78 will be discussed in greater detail below.

In a preferred embodiment, the end cap 78 includes upper and lower segments 78a and 78b, respectively, in addition to the cover 102. The configuration of upper and lower segments 78a,78b will be discussed in greater detail below.

The end cap 78 further preferably includes secondary wire-routing structure 110. The secondary wire-routing structure 110 preferably includes upper first and second sets 112 and 114, respectively, of arcuately spaced apart, generally axially extending tabs 116 and 118, respectively. The secondary wire-routing structure 110 further preferably includes a lower first barrier 120 comprising an at least substantially continuous, generally axially extending wall 124 and a lower second set 122 of arcuately spaced apart, generally axially extending tabs 126. The upper first and second tab sets 112 and 114, respectively, are preferably radially spaced apart from each other so as to define an upper auxiliary wiring pathway 128 therebetween, whereas the lower first barrier and lower second tab set 120 and 122, respectively, are preferably radially spaced apart from each other so as to define a lower auxiliary wiring pathway 130 therebetween.

The tabs or wall 116,118,124,126 of the upper and lower first and second tab sets or barrier 112,114,120,122 preferably each extend axially away from the core 48. More particularly, the tabs 116 and 118 of the upper first and second tab sets 112 and 114, respectively, preferably extend axially away from the upper axial margin 54 of the core 48, while the wall 124 and tabs 126 of the lower first barrier and lower second tab set 120 and 122, respectively, preferably extend axially away from the lower axial margin 56 of the core 48. Each of the upper and lower auxiliary wiring pathways 128 and 130 are thus preferably positioned radially outside the margins 54 and 56 of the core 48.

Furthermore, each of the auxiliary wiring pathways 128 and 130 are preferably disposed radially outside the innermost circumferential face 58 of the core 48. Most preferably, the auxiliary wiring pathways 128 and 130 each preferably overlie the yokes 64 of the core 48.

The end cap 78 further preferably includes tertiary wire-routing structure 132. The tertiary wire-routing structure 132 preferably includes the upper second tab set 114 and an upper third tab set 134, as well as the lower second tab set 122 and a lower third tab set 136. The upper and lower third tab sets 134 and 136 preferably comprise pluralities of arcuately spaced apart, radially extending tabs 138 and 140, respectively.

The upper second and third tab sets 114 and 134, respectively, are preferably radially spaced apart from each other. The lower second and third tab sets 122 and 136, respectively, are also preferably radially spaced apart from each other. The upper and lower second and third tab sets 114,122,134,136 cooperatively preferably define a plurality of generally toroidal coil pathways 142 therebetween. (The coil pathways 142 extend through the aforementioned slots 34 formed between the teeth 62.) The coils 52 are preferably wound about the teeth 62 in the coil pathways 142.

The tertiary wire-routing structure 82 is particularly well suited toward restricting radially inward and outward shifting of the coils 52 (e.g., radially inward or outward slippage or straying of wiring 50 comprising a given one of the coils 52).

The tabs 116,118,126,138,140 of each set may be identical to each other or may vary relative to one another. For instance, the tabs 138 and 140 of the third tab sets 134 and 136 are preferably identical to each other. In contrast, the tabs 116 of the upper first tab set 112 and the tabs 118 and 126 of the second tab sets 114 and 122, respectively, preferably vary in size and shape within the each set. More particularly, the tabs 116, 118, and 126 of each set 112, 114, and 122 preferably generally alternate arcuately between wider and narrower forms.

It is also permissible according to some aspects of the present invention for one or more of the tabs to be replaced by a continuously extending barrier wall or a partial barrier wall (i.e., a combination of tabs and larger segments) and/or for the barrier wall to be replaced by tabs or a combination of wall segments and tabs.

In a preferred embodiment, the end cap 78 is fixed relative to the core 48 to prevent relative rotation therebetween. Such fixation may be by any means known in the art, including but not limited to one or more of overmolding; interengaging splines; heat staking; adhesives; fasteners such a screws, bolts, or pins; friction; or the provision of integral structural features that restrict such movement. Preferred means of fixation of the end cap 78 relative to the stator core 48 will be discussed in greater detail below.

The end cap 78 is preferably composed of a synthetic resin material, although a different type or types of material, preferably being at least substantially electrically insulative, could be used without departing from the spirit of the present invention.

In a preferred embodiment, the end cap 78 additionally includes a plurality of tooth coverings 144 each overlying portions of a respective one of the teeth 62 of the stator core 48. More particularly, each tooth covering 144 preferably includes an upper and lower yoke portion 146 and 148, an upper and lower arm portion 150 and 152, and an upper and lower crown portion 154 and 156. The upper and lower yoke portions 146 and 148 overlie respective upper and lower faces 70 and 72 and corresponding portions of the side faces 74 of the corresponding tooth 62 adjacent the yoke 64. The upper and lower arm portions 150 and 152 overlie respective upper and lower faces 70 and 72 and corresponding portions of the side faces 74 of the corresponding tooth 62 adjacent the arm 66. The upper and lower crown portions 154 and 156 overlie respective upper and lower faces 70 and 72 and corresponding portions of the side faces 74 of the corresponding tooth 62 adjacent the crown 68.

It is particularly noted that, in a preferred embodiment, the upper and lower yoke portions 146 and 148 cooperate with the upper and lower first and second tab sets and barrier 112,114,120,122 to define the upper and lower auxiliary wiring pathways 128 and 130.

Preferably, the outermost circumferential face 60 of the stator core 48 remains at least substantially exposed (i.e., is at least substantially devoid of coverings associated with the end cap 78 and/or other structure).

In a preferred embodiment, as noted previously, the end cap 78 includes upper and lower segments 78a and 78b. The upper end cap segment 78a preferably includes the trough 84; the upper first, second, and third tab sets 112, 114, and 134, respectively; and the upper yoke portions, arm portions, and crown portions 146, 150, and 154, respectively. The lower end cap segment 78b preferably includes the lower first, second, and third barrier and tab sets 120, 122, and 136, respectively; and the lower yoke portions, arm portions, and crown portions 148, 152, and 156, respectively. It is permissible according to some aspects of the present invention, however, for the end cap to comprise more or fewer segments. For instance, the end cap might alternatively comprise a cover and a unitary, integrally formed body.

As noted previously, the end cap 78 preferably includes a cover 102 that cooperates with the wire-routing structure 82 to at least substantially enclose the wiring pathway 86. More particularly, the cover 102 is generally annular in form and includes a generally radially extending roof portion 158, a generally axially extending engagement portion 160, and a generally sloped portion 162 extending between and interconnecting the roof portion 158 and the engagement portion 160. The roof portion 158, the engagement portion 160, and the sloped portion 162 preferably each extend continuously circumferentially.

Figure 6:
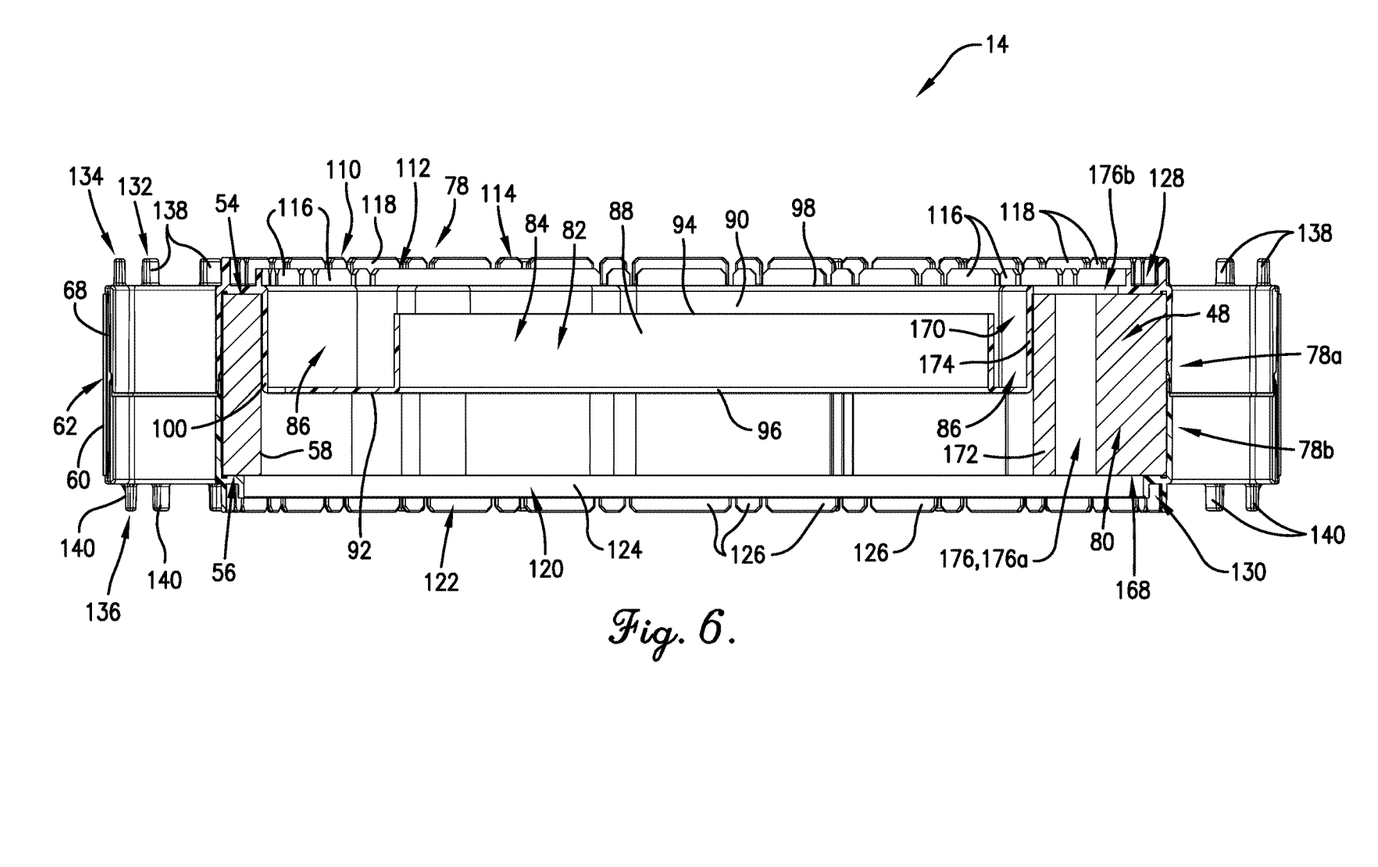
FIG. 6 is a cross-sectional side view of the stator and end cap of FIGS. 1-5, taken along line 6-6 of FIG. 5, with the coils and cover removed.
Figure 6A:
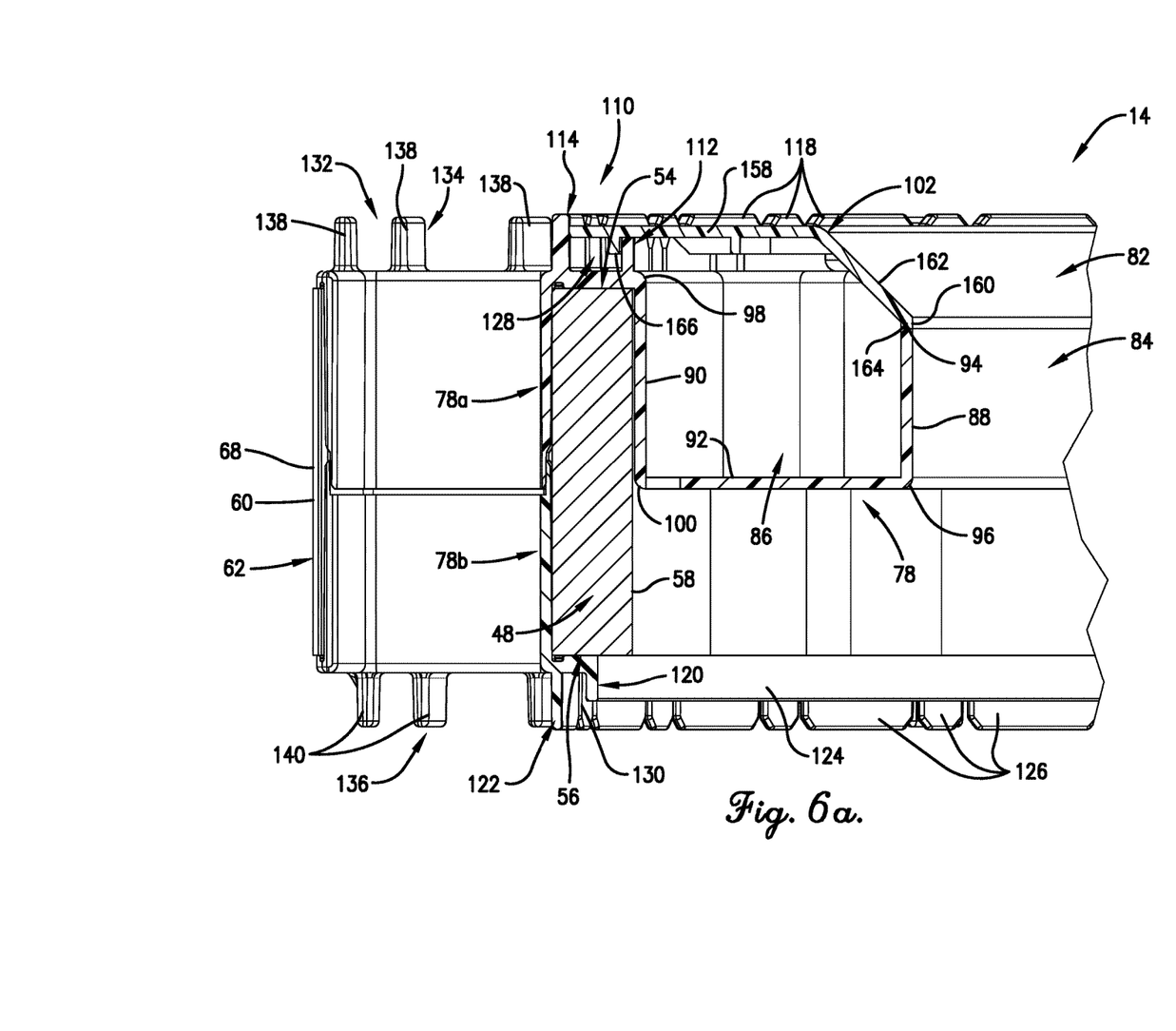
FIG. 6a is an enlarged, cross-sectional side view of a portion of the stator and end cap of FIG. 6, with the cover reinstated.

As best shown in FIG. 6a, the engagement portion 160 preferably defines a first engagement face 164 that abuts the top edge 94 of the inner side 88 of the trough 84. The roof portion 158 and the sloped portion 162, in contrast, are preferably axially spaced from the top edges 94 and 98 of the inner and outer sides 88 and 90, respectively.

Preferably, the cover 102 includes a retaining wall 166 extending generally axially from the roof portion 158. The retaining wall 166 preferably circumscribes and engages the tabs 116 of the upper first tab set 112 such that radial shifting of the cover 102 relative to the wire-routing structure 82 and, in turn, the remainder of the end cap 78, is at least substantially prohibited.

As noted previously, the motor 10 preferably includes a stator mount 80. The stator mount 80 is preferably operable to facilitate mounting of the stator to the machine (not shown).

In a broad sense, it is preferred that the stator mount 80 be radially located within the wiring pathway 86. More particularly, in a preferred embodiment, as illustrated, the stator mount 80 preferably comprises a plurality of arcuately spaced bosses 188 that extend radially inwardly relative to the outer side 90 of the trough 84 but are radially spaced from the inner side 88 of the trough 84. Thus, the inner side 88 of the trough 84 and each of the bosses 88 define a radial gap 170 therebetween.

Provision of the radial gap 170 enables the wiring pathway 86 to extend continuously circumferentially, as noted above. Furthermore, it is noted that positioning of the stator mount 80 so as to be radially located within the wiring pathway 86 enables a more efficient use of space than would be provided by a design in which the stator mounting structure extends radially inward relative to the inner side of the trough.

Figure 7:
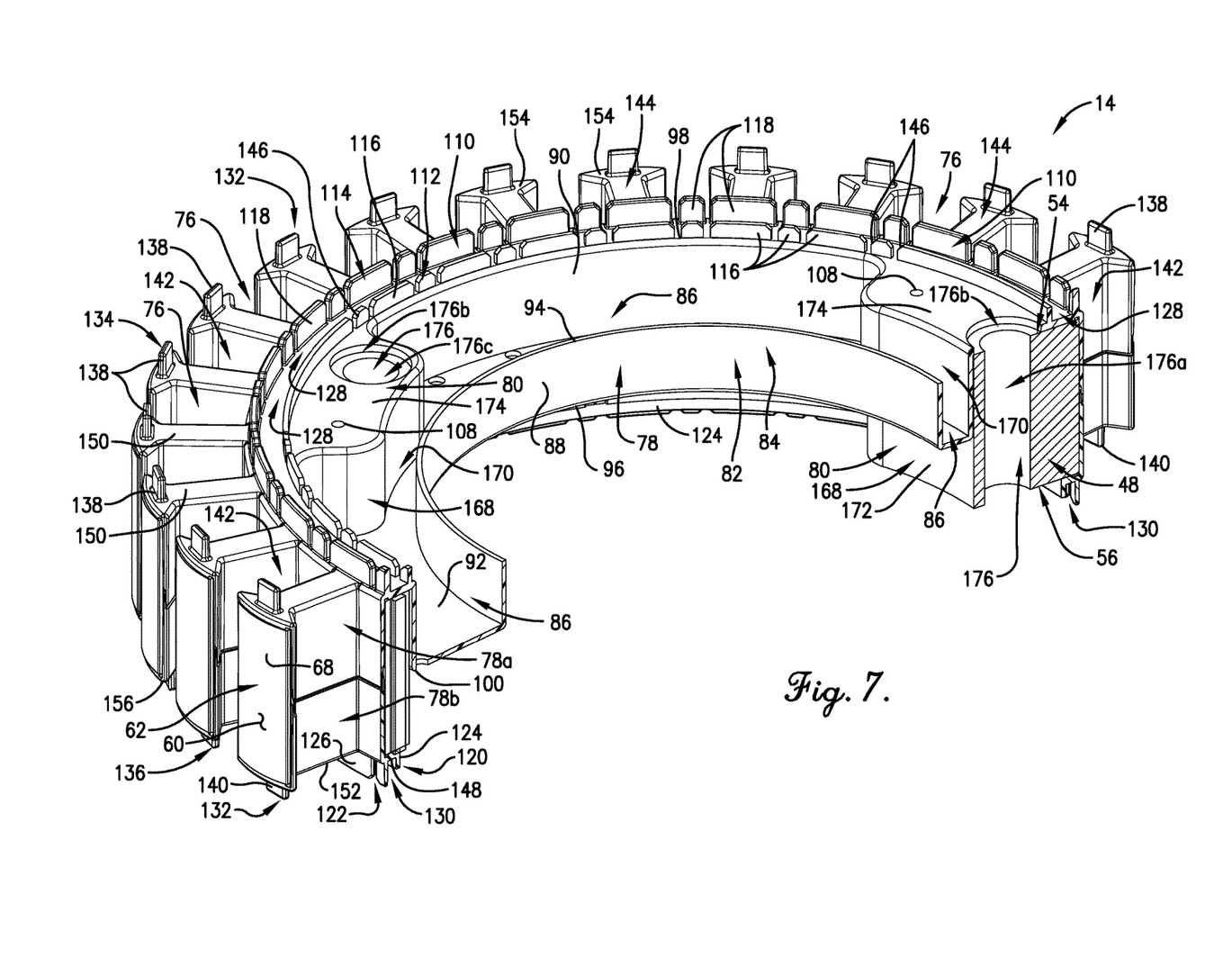
FIG. 7 is a bottom perspective view of the cross-sectioned stator of FIG. 6, with the coils and cover removed.

Preferably, the bosses 168 include both mounting projections 172 formed by the stator core 48 and mounting protrusions 174 formed by the end cap 78. More particularly, each of the mounting protrusions 174 preferably overlies at least part of a corresponding one of the mounting projections 172. As shown in FIGS. 6, 7, and others, for instance, in a preferred embodiment, each of the mounting protrusions 174 comprises a thin layer of the electrically insulative material forming the end cap 78, whereas the mounting projections 172 comprise thick blocks of the core 48. Preferably, the mounting projections 172 extend from the upper axial margin 54 to the lower axial margin 56 of the core 48.

In a preferred embodiment, each of the bosses 168 in part defines a fastener-receiving opening 176 therethrough. The fastener-receiving openings 176 are configured to receive fasteners (not shown; e.g., screws, bolts, or pins) to secure the stator 14 to the machine, appliance, etc. (also not shown). Preferably, each of the fastener-receiving openings 176 extends through the cover 102, the end cap 78, and the core 48. More particularly, each fastener-receiving opening 176 includes a projection region 176a defined by the corresponding mounting projection 172 of the core 48; a protrusion region 176b defined by the corresponding mounting protrusion 174 of the end cap 78; and a cover region 176c defined by the cover 102. Thus, support of the stator 14 is cooperatively achieved by the fasteners (not shown), the end cap 78 (including the cover 102), and the core 48.

As noted previously, the cover 102 includes a plurality of fastener-receiving holes 106, through which fasteners 104 extend into fastener-receiving apertures 108 in the remainder of the end cap 78. The fastener-receiving apertures 108 in the end cap 78 are preferably defined by the mounting protrusions 174 and, more particularly, by axially extending sockets 174a (best illustrated in FIG. 9). Furthermore, corresponding fastener-receiving orifices 178 are preferably formed in the mounting projections 172 of the core 48, although they might permissibly be formed in an alternate region of the core. The sockets 174a preferably extend into corresponding ones of the orifices 178. Thus, the cover 102 is fixed to both the remainder of the end cap 78 and the core 48.

The bosses 168 are preferably evenly arcuately spaced apart, although uneven spacing may be provided. Furthermore, although three (3) bosses 168 are preferably provided, more or fewer may be present without departing from the scope of the present invention. It is also permissible for the bosses to vary from one another, although identically configured bosses 168 as illustrated are preferred.

Preferably, stator mount 80 is at least substantially axially contained between the upper and lower margins 54 and 56 of the core 48. In the illustrated embodiment, for instance, only the thin layer of electrically insulative material forming each mounting protrusion 174 and perhaps small portions of the fasteners (not shown) extend past the upper axial margin 54, while perhaps only an end of each of the fasteners (not shown; i.e., no portion of the stator mount itself) might extend past the lower axial margin 56.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An outer rotor motor for use in a machine, said motor comprising:

a rotor rotatable about an axis;

a stator spaced at least in part radially inside the rotor, said stator including a generally toroidal core that presents axially spaced apart core margins, said stator further including wiring wound around the core; and an end cap including wire-routing structure facilitating routing of the wiring, said wire-routing structure including a wire-routing trough that defines a wiring pathway through which the wiring is routed, said wire-routing trough being positioned at least in part radially inside the core, said wire-routing trough including a bottom located between the core margins, said wire-routing trough including a first side, said first side being spaced radially inward from the core and projecting at least in part axially relative to the bottom, said end cap further comprising a cover that cooperates with the wire-routing structure to at least substantially enclose the wiring pathway, said wire-routing trough including a second side, said second side being spaced radially outward from the first side, each of said sides presenting an edge, said edges being axially spaced apart, said cover including a generally radially extending portion, a sloped portion, and a generally axially extending portion, said axially extending portion defining a first engagement face abutting a first one of the edges, said radially extending portion and said sloped portion being spaced from the edges.

2. The motor as claimed in claim 1, said cover further including a retaining wall extending generally axially from the radially extending portion, said wire-routing structure including at least one axially extending tab, said retaining wall engaging said at least one tab such that radial shifting of the cover relative to the wire-routing structure is at least substantially prohibited.

3. An outer rotor motor for use in a machine, said motor comprising:

a rotor rotatable about an axis;

a stator spaced at least in part radially inside the rotor, said stator including a core and wiring wound around the core;

an end cap positioned at least in part radially inside the core, said end cap including wire-routing structure facilitating routing of the wiring, said wire-routing structure including a wire-routing trough that defines a wiring pathway though which the wiring is routed; and a stator mount presenting a fastener-receiving opening configured to receive a fastener to mount the stator to the machine, said wire-routing trough including first and second sides, said first and second sides being radially spaced from one another, said stator mount being radially located within the wiring pathway so as to be at least partly disposed between said first and second sides.

4. The motor as claimed in claim 3, said wire-routing trough extending generally circumferentially.

5. The motor as claimed in claim 4, said wire-routing trough being circumferentially continuous.

6. The motor as claimed in claim 3, said end cap being fixed to the core to prevent relative rotation therebetween.

7. The motor as claimed in claim 3, said end cap comprising an electrically insulative material.

8. The motor as claimed in claim 3, said end cap further including secondary wire routing structure comprising a first set of arcuately spaced apart, axially extending tabs.

9. The motor as claimed in claim 8, said secondary wire routing structure further comprising a second set of arcuately spaced apart, axially extending tabs, said first and second sets of tabs being radially spaced apart from each other so as to define an auxiliary wiring pathway therebetween.

10. The motor as claimed in claim 3, said end cap further comprising a cover that cooperates with the wire-routing structure to at least substantially enclose the wiring pathway.

11. The motor as claimed in claim 10, said second side being spaced radially outward from the first side, each of said first and second sides presenting an edge, said edges being axially spaced apart, said cover including a generally radially extending portion, a sloped portion, and a generally axially extending portion, said axially extending portion defining a first engagement face abutting a first one of the edges, said radially extending portion and said sloped portion being spaced from the edges.

12. The motor as claimed in claim 11, said cover further including a retaining wall extending generally axially from the radially extending portion, said wire-routing structure including at least one axially extending tab, said retaining wall engaging said at least one tab such that radial shifting of the cover relative to the wire-routing structure is at least substantially prohibited.

13. The motor as claimed in claim 3, said stator mount presenting a plurality of said fastener-receiving openings, said stator mount comprising a plurality of arcuately spaced apart bosses, each of which defines a respective one of said fastener-receiving openings therethrough.

14. The motor as claimed in claim 13, said end cap including a plurality of mounting protrusions, each of said bosses including one of the mounting protrusions.

15. The motor as claimed in claim 13, said core including a plurality of mounting projections, each of said bosses including a corresponding one of the mounting projections.

16. The motor as claimed in claim 15, said end cap including a plurality of mounting protrusions, each of said bosses further including one of the mounting protrusions.

17. The motor as claimed in claim 16, each of said mounting protrusions overlying at least part of a corresponding one of said mounting projections.

18. The motor as claimed in claim 3, said core being generally toroidal and presenting axially spaced apart core margins, said wire-routing trough including a bottom located between the core margins, said first side being spaced radially inward from the core and projecting at least in part axially relative to the bottom, said stator mount being radially spaced from said first side to define a radial gap therebetween.

19. The motor as claimed in claim 18, said second side being spaced radially outward from the first side, said mounting structure extending from the second side and being radially spaced from the first side.

20. The motor as claimed in claim 3, said core being generally toroidal and presenting axially spaced apart core margins, said stator mount being at least substantially axially contained between the core margins.

21. The motor as claimed in claim 3, said core being generally toroidal and presenting axially spaced apart core margins, said wire-routing trough being positioned at least in part radially inside the core, said wire-routing trough including a bottom located between the core margins, said first side being spaced radially inward from the core and projecting at least in part axially relative to the bottom.

22. The motor as claimed in claim 21, said bottom being generally centered between the core margins.

23. The motor as claimed in claim 21, said core presenting a radially innermost circumferential core face, said second side being spaced radially outward from the first side, said second side of the wire-routing trough abutting said radially innermost circumferential core face.

24. The motor as claimed in claim 21, said second side being spaced radially outward from the first side, each of said sides presenting a top edge and a bottom edge, said bottom extending between and interconnecting the bottom edges.

25. The motor as claimed in claim 21, said second side being spaced radially outward from the first side, said sides being at least substantially parallel.

* * * * *